United States Patent

Pysh

[11] 4,195,657
[45] Apr. 1, 1980

[54] SURGE PROTECTION VALVE

[75] Inventor: William A. Pysh, Erie, Pa.

[73] Assignee: Techno Corporation, Erie, Pa.

[21] Appl. No.: 14,719

[22] Filed: Feb. 23, 1979

[51] Int. Cl.² .............................................. F16K 17/00
[52] U.S. Cl. ................................ 137/460; 137/512.15;
                                                              137/521
[58] Field of Search ................ 137/460, 512.15, 512.4,
                                                137/512.5, 521; 98/119

[56] References Cited

U.S. PATENT DOCUMENTS

| 2,800,920 | 7/1957 | Smith | 137/512.15 |
| 2,998,080 | 8/1959 | Smith | 137/512.15 X |
| 3,047,012 | 7/1962 | Smith | 137/512.15 |

Primary Examiner—Harold W. Weakley
Attorney, Agent, or Firm—Charles L. Lovercheck

[57] ABSTRACT

A damper valve is disclosed having a hollow body and two valve plates controlled by a velocity sensitive linkage allowing the passage of normal system velocity, but closing when the velocity exceeds normal flow rates as would occur with an air surge caused by a tornado. The mechanism is made up of a three bar trip linkage connected to the valve plate in such manner so that when the linkage roller arm is held in the lower position by the cam seat, the valve plates (damper blades) are held in open position.

9 Claims, 6 Drawing Figures

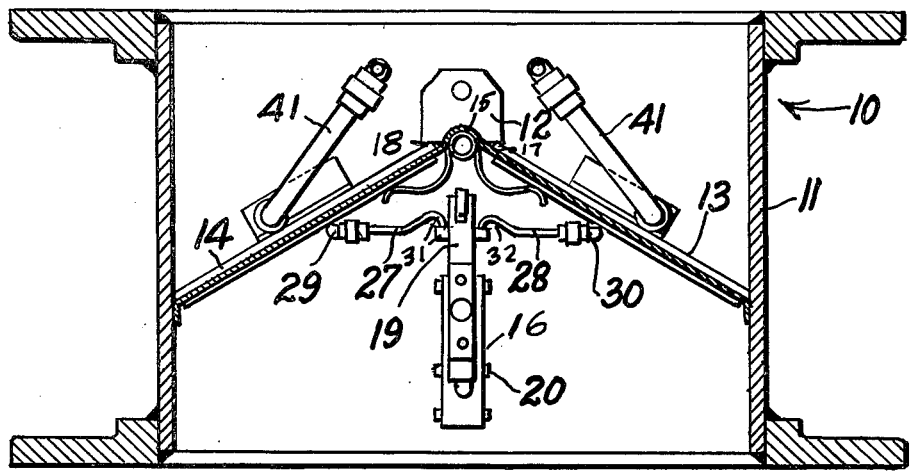
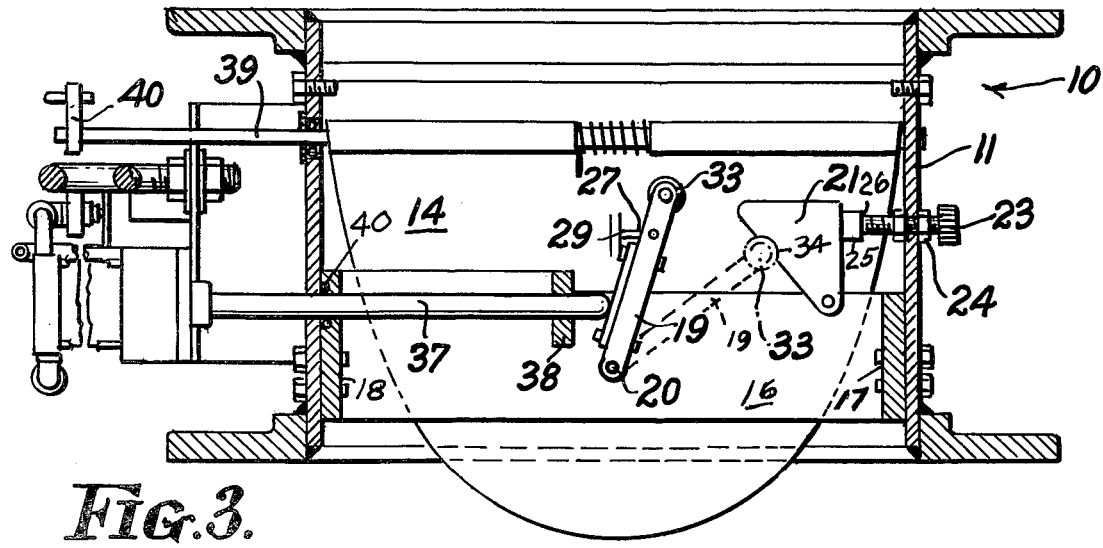
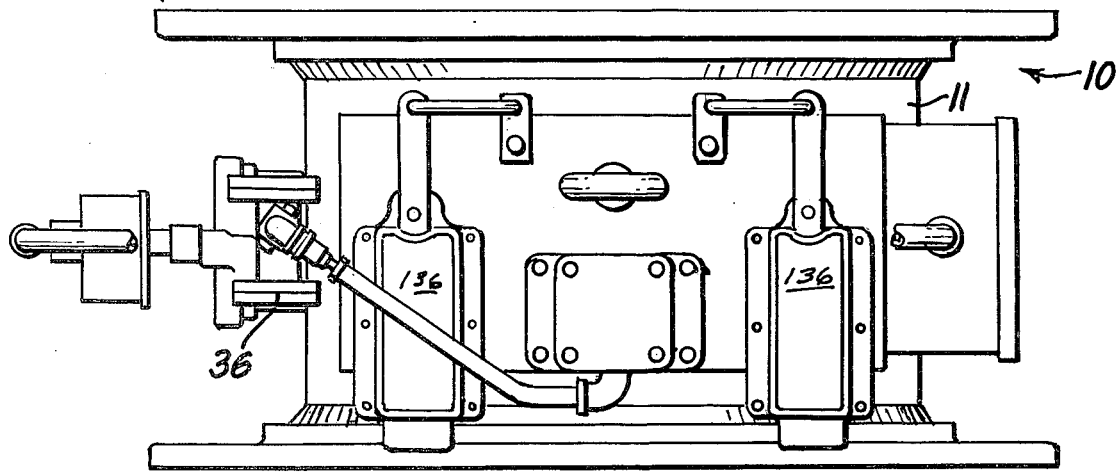

SURGE PROTECTION VALVE

GENERAL DESCRIPTION OF THE INVENTION

The outlet side of the dampers act as standard check valves, allowing the passage of normal air flow, but closing to prevent and reversal, as would occur with overflow to the uncompensated deficit in the tornado vortex.

The inlet side of the dampers are velocity sensitive, allowing the passage of normal system velocities, but closing when the velocity exceeds normal flow rates, as would occur with air flow surges caused by a tornado.

The mechanism which provides the velocity sensitivity is shown on Drawings. The three bar trip linkage is connected to the valve plates such that when the linkage roller arm is held in the lower position by the cam seat, the valve plates (damper blades) are held in the open position.

With flow through the damper, there will be a pressure within the apex of the valve plates trying to move them apart to the closed position, this force is resisted by the holding action of the cam seat on the roller arm. This force is adjustable by the adjusting screw.

As the flow velocity increases the pressure in the apex increases, until, at the predetermined set point the closing force overcomes the holding force, pulling the roller arm out of the cam seat, allowing the damper blades to close.

The inlet side blades may be repositioned following a tornado that closes the valve by extending the reset operator to replace the roller arm in the cam seat. The outlet side blades will reopen with the return of normal system operation.

The inlet side of the dampers can also be operated on command to close to isolate the downstream system from the outside atmosphere.

OBJECTS OF THE INVENTION

It is an object of the invention to provide an improved valve.

Another object of the invention is to provide a damper valve that is simple in construction, economical to manufacture and simple and efficient to use.

Another object of the invention is to provide an improved damper valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a longitudinal cross-sectional view of the valve.

FIG. 2 is a longitudinal cross-sectional view of the valve taken at right angles to FIG. 2.

FIG. 3 is a top view of the valve.

DETAILED DESCRIPTION OF THE DRAWINGS

Figure 4:
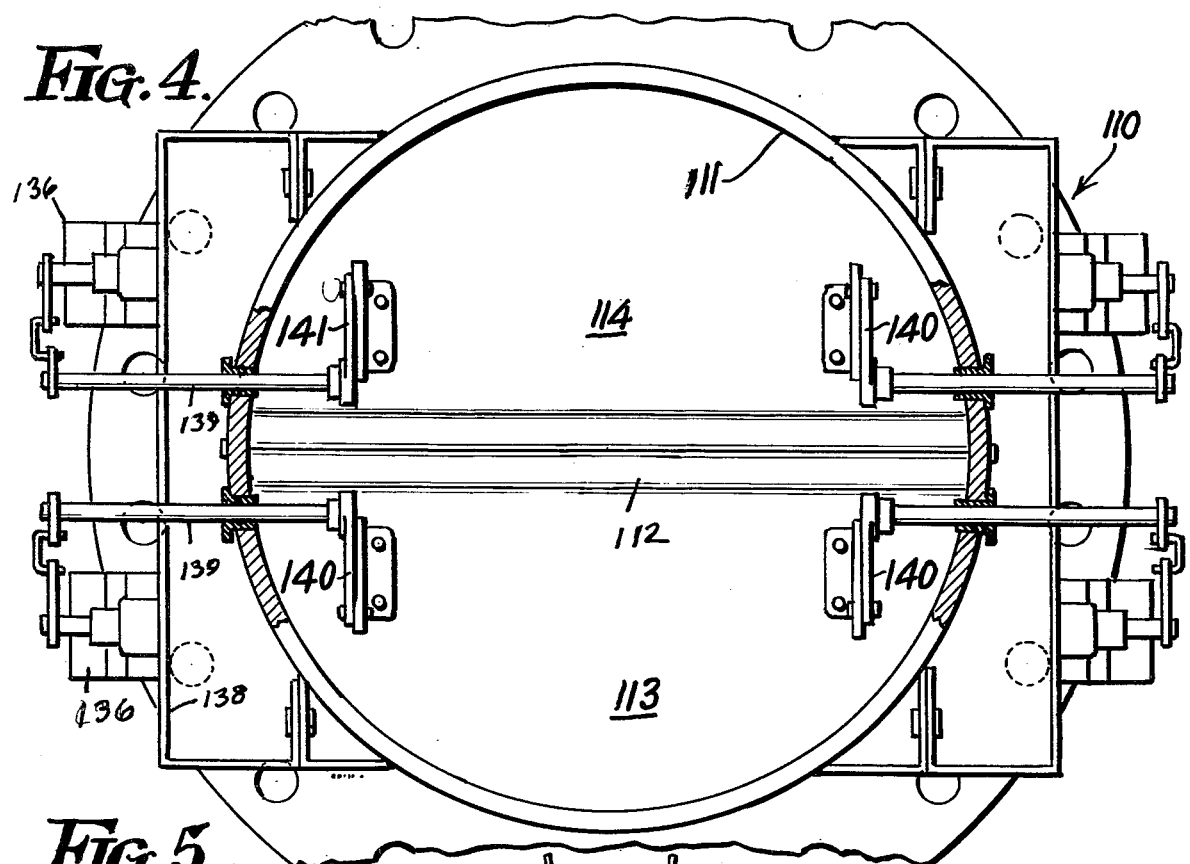
FIG. 4 is an end view of the embodiment of FIG. 5.

Now, with more particular reference to the drawings, valve 10 is shown having a hollow cylindrical body 11, a central support 12 extends diametrically across the valve body and is affixed to its ends to the body, two valve plates 13 and 14 are swingably supported on the central support and they have outwardly extending seals on their ends of engaging the inner periphery of the valve body to form a seal therewith. The rubber sheet material 15 forms a means for swingably supporting the valve plates on the support 12. Support plates 16 extend diametrically across the hollow body generally parallel to the support and the ends 17 and 18 of the support plate are fixed to the inner periphery of the cylindrical body. A roller arm 19 is pivotedly supported on the support plate by means of the pivot means 20 and a cam member 21 has a notch 34 in it that receives the roller 33. Slidable means 25 connects the inner end 26 of the adjusting means to the cam member 21. A first connecting rod 27 and a second connecting rod 28 are pivoted at 29 and 30 to the first valve plate 13 and the second valve plate 14. The second ends 31 and 32 of the connecting rods are swingably connected to the roller link 19. Roller link 19 has a roller 33 on its distal end and roller 33 is received in the notch 34 in the cam when the valve plates 13 and 14 are swung to open position. The valve plates are adapted to have a force exerted on them by fluid flowing through the hollow cylindrical body in proportion to the velocity of said flow, whereby said plates exert a force on said roller link, urging said roller link to pull said roller out of said notch, allowing said valve plates 13 and 14 to swing to close position when the valve plates have a force exerted on them by fluid flowing through the hollow cylindrical valve in proportion to the velocity of said flow.

To reopen the valve, the operator rod 37 is slidably supported in the side wall of the valve body and has the seal 40 which prevents leakage. The valve rod 37 is operated by the solenoid 36 which could be a hydraulic cylinder or a suitable air cylinder and the rod 37 slides through the bracket 38 into engagement with the arm 19.

Figure 5:
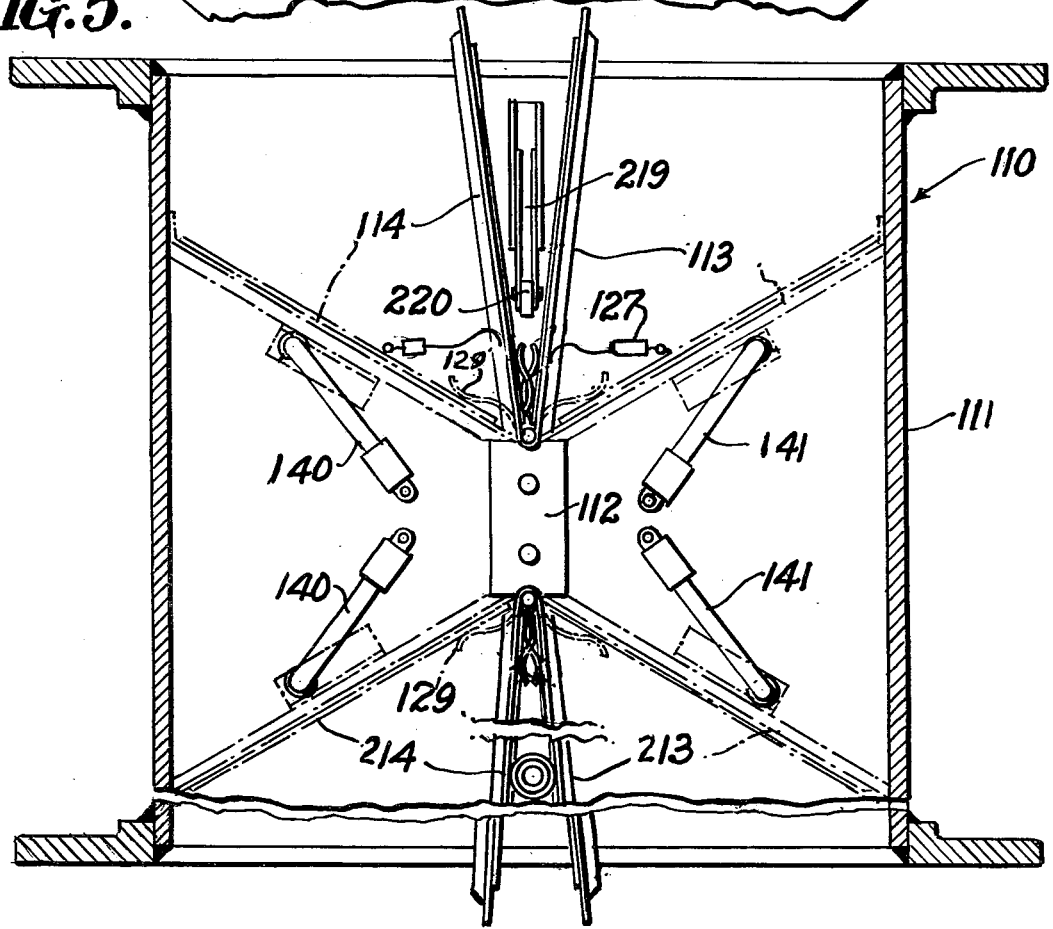
FIG. 5 is a longitudinal cross-sectional view of the valve of FIG. 4.
Figure 6:
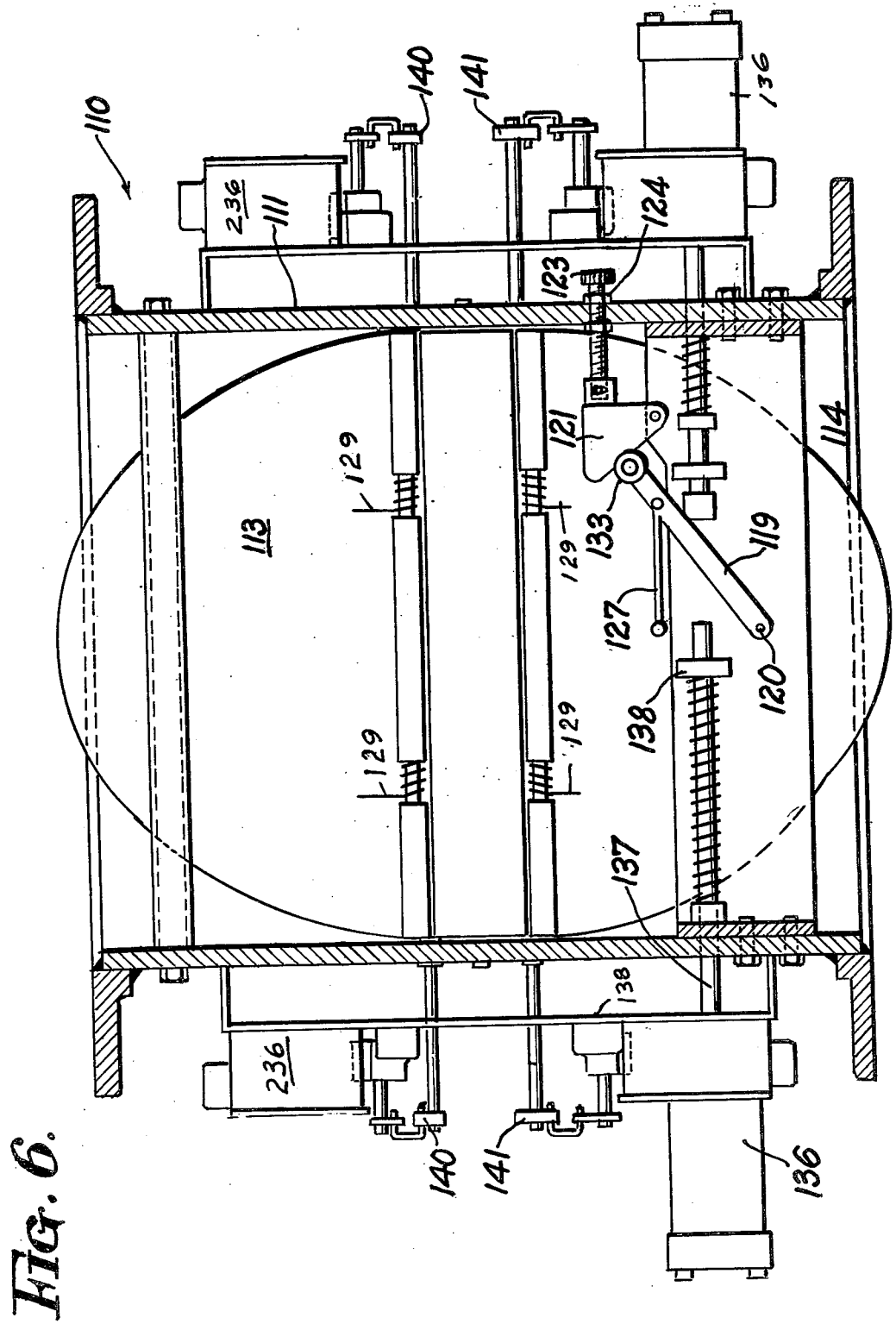
FIG. 6 is a cross-sectional view of the valve taken at right angles to the view shown in FIG. 5.

In the embodiment of the invention shown in FIGS. 4, 5 and 6, I show a valve 110 having a body 111 with central support 112 having support plates 113 and 114 swingably supported thereon as in FIGS. 1 and 2. The valve bodies have reset cylinders 136 supported on their wall, which have rods 137 that extend through the bracket 138 and suitable seals in the valve body to move the swinging arm 119 having the roller 133 which engages the notch in the cam 121 for moving the swinging arm 119 around the pivot 120, which is supported in the support plates similar in FIGS. 1, 2 and 3. The rods 137 have return springs thereon which return them to neutral position, and when the valve plates are swung open the rods 139 swing the cranks 140 and 141 to move the limit switches 136 to indicate the position of the valve plates. The adjusting screw 123 moves the cam toward the roller 133 to adjust the force required to move the lever 119 and through the links 127 to move the valve plates.

The right half of the valve in FIG. 6 is a simple check valve with valve plates 213 and 214 which are engaged by springs 129 urging them closed. Position indicator switches 236 and 237 that are operated by arms 140 and 141 indicate the position of the valve plates. Springs 129 urge the valve toward closed position. The valve may be mounted in a direct line by means of the flanges shown.

When installed in a fluid line the valve plates of the valve will close when an unusually heavy flow of gas passes through the valve which causes the valves to unseat the roller from notch 34. The check valve will prevent flow of FIGS. 4 through 6 in the reverse direction.

The foregoing specification sets forth the invention in its preferred, practical forms but the structure shown in capable of modification within a range of equivalents without departing from the invention which is to be understood is broadly novel as is commensurate with the appended claims.

The embodiments of the invention in which an exclusive property or privilege is claimed are defined as follows:

1. A valve (10) having a hollow cylindrical body (11), a central support (12) extending diametrically across said valve body and fixed thereto at its ends, two valve plates (13, 14), sealing means (15) swingably supporting said valve plates on said support to swing into engagement with the inner periphery of said cylindrical body closing the passage through said body and swingable toward each other to open position, support plate (16), said support plate extending diametrically across said hollow cylindrical body generally parallel to said central support, the ends (17, 18) of said support plate being fixed to the inner periphery of said cylindrical body, a roller arm (19), pivot means (20) swingably attaching said roller arm (19) to said support plate (16), a cam member (21), pivot means (20) swingably connecting said cam member to said support plate, slidable means (25) connecting the inner end (26) of said adjusting means to said cam member (21), a first connecting rod (27) and a second connecting rod (28), pivot means (29) pivotably connecting the first end of said first connecting rod (27) to said first valve plate (13), and second pivot means (30) pivotably connecting the first end of said second cam rod to said second valve plate (14), said second ends (31, 32) of said connecting rod being swingably attached to said roller link (19), said roller link (19) having a roller (33) on its distal end, and a notch (34) in said cam receiving said roller, when said valves are in open position disposed generally in planes parallel to said support plate (16), said support plates being adapted to have a force exerted thereon by fluid flowing through said hollow cylindrical body in proportion to the velocity of said flow, whereby said plates exert a force on said roller link urging said roller link to pull said roller out of said notch allowing said valve plates (13, 14) to swing to closed position.

2. The valve recited in claim 1 wherein said means urging said cam to swing toward said roller link comprises,
an adjusting screw (24),
and means threadably supporting said adjusting screw (24) on said body (11),
said adjusting screw (23) extending diametrically into said valve body (11) and means on the end of said adjusting screw engaging said cam member (21).

3. The valve recited in claim 2 wherein two second valve plates are supported in said center support and adapted to swing into engagement with said hollow cylindrical body in a direction opposite to said first mentioned valve plates,
and spring means urging said second mentioned valve plates into engagement with the inside surface of said cylindrical body.

4. The valve recited in claim 1 wherein said cam member comprises a plate having a notch therein,
said notch receiving said roller on said roller arm.

5. The valve recited in claim 4 wherein said means urging said cam to swing towards said roller link comprises an adjusting screw and means threadably supporting said adjusting screw on said body.

6. The valve recited in claim 5 wherein said adjusting screw (23) extends diametrically into said body (11) and means on the end of said adjusting screw for adjusting said cam plate relative to said roller arm.

7. The valve recited in claim 6 wherein spring means is provided for urging said mentioned valve plates into engagement with inside surface of said cylindrical body.

8. The valve recited in claim 1 wherein reset means is provided extending through one side of said cylindrical body and engaging said swing arm.

9. A valve (10) having a hollow cylindrical body (11), support means (12) in said valve attached to said hollow body,
two valve plates,
said valve plates being swingably supported on said support means,
a support plate fixed to said valve body (11) and extending diametrically across said body and spaced below said central support,
a roller arm (19),
pivot means (20) swingably attaching said roller arm (19) to said support plate,
a cam member (21),
pivot means swingably connecting said cam member to said support plate,
first connecting rod to the second connecting rod,
pivot means swingably connecting said rods to said valve points and to said valve plates whereby said roller arm draws said valve plates together when said roller arm swings toward said cam plate thereby folding said arms.

* * * * *